United States Patent [19]

Hicks

[11] Patent Number: 4,551,483
[45] Date of Patent: Nov. 5, 1985

[54] FIRE-RETARDANT POLYURETHANE FOAM CONTAINING FINELY GROUND DRY FIRE-RETARDANT PARTICLES CONTAINING A VOLATILE ACTIVE FIRE-RETARDANT COMPONET

[76] Inventor: Hamilton Hicks, 60 Butternut Hollow Rd., Greenwich, Conn. 06830

[21] Appl. No.: 650,062

[22] Filed: Sep. 13, 1984

Related U.S. Application Data

[63] Continuation-in-part of Ser. No. 535,058, Sep. 23, 1983, Pat. No. 4,504,603.

[51] Int. Cl.$^4$ .............................................. C08G 18/14
[52] U.S. Cl. .................................... 521/103; 521/106; 521/123; 521/128; 523/179

[58] Field of Search ............... 521/103, 106, 123, 128; 523/179

[56] References Cited

U.S. PATENT DOCUMENTS

| 3,330,783 | 7/1967 | Piechota et al. | 521/906 |
| 4,315,078 | 2/1982 | Anorga | 521/103 |
| 4,467,056 | 8/1984 | Staendeke et al. | 531/179 |

Primary Examiner—Maurice J. Welsh
Attorney, Agent, or Firm—Kenyon & Kenyon

[57] ABSTRACT

A molded polyurethane foamed shape has finely ground dry fire-retardant particles containing a volatile active fire-retardant component which releases fire-retardant gas when exposed to fire and distributed throughout the shape and encapsulated by the polyurethane so as to protect the component against evaporation until exposed by initial burning of the shape.

10 Claims, No Drawings

FIRE-RETARDANT POLYURETHANE FOAM CONTAINING FINELY GROUND DRY FIRE-RETARDANT PARTICLES CONTAINING A VOLATILE ACTIVE FIRE-RETARDANT COMPONET

This is a continuation-in-part of Ser. No. 535,058, filed Sept. 23, 1983, now U.S. Pat. No. 4,504,603.

Polyurethane foam is used for airplane and automobile parts. When burning it produces toxic gases. It is used because of its resilient characteristic and because it can be molded to the shapes required. It is important to make the foam fire retardant.

Polyurethane foam shapes are molded by using a two part mold which when closed form a cavity of the desired shape and into one of which a just blended polyurethane, comprising polyol blended with a catalyst, is poured and the other mold part is quickly closed on the first part to form the cavity. The amount of the blend is proportioned to only partly fill the cavity prior to foaming. The polyurethane foams quickly and fills the mold cavity, after which the mold is opened and the molded shape is removed.

Known methods of applying a fire retardant to the polyurethane foam shape, are ineffective. For other materials it is known that various dry fire-retardant substances can be ground and incorporated with water and applied by painting, spraying, etc., with some effectiveness.

One problem has been that such fire retardants include active components which are essentially volatile so that if applied to the surface of the foam their effectiveness after drying is short lived.

The present inventor has discovered that when such fire-retardant substances are finely powdered and blended dry directly into the polyol of the polyurethane blend prior to its foaming by blending in the catalyst, they are distributed during foaming throughout the foam as fine particles which are encapsulated by the polyurethane so as to protect them from evaporation after foaming is completed. Protection against being worn away as in the case of a surface application, is also provided. The fire-retardant particles remain substantially unchanged until released by initial burning of the foam, at which time they become effective as a fire retardant.

For the above purpose, of the various known fire-retardants, ammonium phosphate, ammonium chloride, sodium bicarbonate and borax have been found to be most effective. These are mixed and before or after mixing are finely ground. For testing purposes 4 ounces of ammonium phosphate, 8 ounces of ammonium chloride, 6 ounces of sodium bicarbonate and 6 ounces of borax are made into a fine grind to make 24 ounces of powdered fire-retardant mix. This mix is blended into 100 grams of polyol of the commercially available foaming type, a commercial catalyst is added and this polyurethane blend is inserted in the mold and the mold is immediately closed, foaming starting almost immediately so that the mold is filled and a molded shape produced with the fine particles of fire retardant encapsulated by the polyurethane.

Resulting moldings have been tested by the application of flame and it was found that the fire-retardant component went into action immediately and completely stopped burning of the foam and the resulting toxic smoke. This is important not only in seating material and the like but also in the foam insulation used in housing for thermal insulation.

In the foregoing 25 to 30 grams of the finely ground fire-retardant mix was used per the 100 grams of polyol liquid material. These were mixed in the polyol liquid at high speed to effect a complete disbursion. 50 grams of the catalyst were then quickly blended and the result poured quickly into the mold so that the polyurethane test product was produced.

It is believed that there are two reactions taking place when fire impinges on the foam, both being thermal in nature. The borax turns slightly acidic and activates the release of carbon dioxide from the sodium bicarbonate. This reaction only takes place when fire hits the foam. The finely ground mix of retardants although dry in the foam encapsulated by the polyurethane, are released when burning is initiated. The fire creates a very small amount of water which causes a fast release of the carbon dioxide from the sodium bicarbonate because of an acid release caused or manufactured during burning by the borax. Thereafter or at a slower rate the heat causes the release of ammonia gas from the ammonium phosphate and ammonium chloride, so that the hot foam is prevented from reigniting after being initially smothered by the carbon dioxide. These reactions take place in a fraction of a second to knock out fire and then prevent flare-up and toxic smoke.

The addition of the fire-retardant mix described herein before, increases the density of the foam, but this density is always dependant on the relationship between the amount of polyurethane blend charged as related to the volume of the mold cavity in which the foaming occurs. This applies whether or not the blend is used alone or in accordance with the practice of the present invention. Any practical degree of density can be obtained in either case.

As indicated hereinabove, polyurethane foam is made from polyol blended with a catalyst, normally isocyanate. These components are obtainable commercially from manufacturers who provide recommendations on how to proportion the two components. The rise and density of the foaming normally depends on the proportioning.

An extensive review of the fire-retardant aspects is provided by Kirk-Othmer, Encyclopedia of Chemical Technology, Third Edition, Volume 10, pages 348 to 419.

The present invention diverges from the prior art in that it makes use of fire-retardant chemicals which might seem to be unsuitable for commercial use with polyurethane foam. These are ammonium chloride which sublimes and is water soluble; ammonium phosphate which loses ammonia on exposure to air and is water soluble; sodium borate (borax) which is efflorescent in dry air and is water soluble; and sodium bicarbonate which is of course soluble in water. The compounds lose their characteristics in air with time and are in this sense volatile.

The four compounds are described by The Merck Index of Chemicals and Drugs, Seventh Edition.

To recapitulate, the present invention makes practicable such use by intermixing the compounds in finely ground and dry condition to form a powder mix which is as uniformly as possible dispersed throughout or blended in the polyol and then blending in the isocyanate so as to produce the foam.

Individual particles of the mix are encapsulated, or completely embedded, in the polyurethane of the foam, so as to be sealed against change by evaporation or moisture. The polyol and isocyanate manufacturers recommendations as to proportioning can be followed. The particle size of the mix should not be too large for complete encapsulation by the polyurethane foam cell walls and if too small in the case of the ammonium compounds their ammonia will be lost too rapidly prior to mixing in the polyol, a loss indicated by a strong ammonia odor. Microscopic examination of a cut specimen of this foam under reflected light exhibits a display of bright points of light characteristic of the reflective properties of crystals, when using 100x magnification. It is believed that this display occurs by cutting through the cell walls so as to expose the crystaline particles of one or more of the compounds. They are also exposed when the foam burns.

In the tests described below the intermixed ammonium and sodium compounds were blended in the polyol so as to represent from 30 to 35% of the weight of the polyol. In other words, 30 to 35 grams of the mixture per 100 grams of polyol. Addition to this of the isocyanate as recommended by the materials manufacturer resulted in foams having the physical properties required for parts as used by automobile and airplane manufacturers.

The four compounds were thoroughly intermixed and before or after mixing ground so that all particles were of adequately small size, the particle size of the ammonium compounds being large enough to prevent the excessive loss of ammonia. The mixture of completely dry particles was blended at high mixing speed into 100 grams of polyol and the quantity of isocyanate recommended by the manufacturer was thereafter added so that foaming occurred.

TEST I

The ammonium and sodium compounds had the following proportions:
8 ounces by weight Ammonium Chloride
4 ounces by weight Ammonium Phosphate
6 ounces by weight Sodium Borate or Borax
6 ounces by weight Sodium Bicarbonate This foam was initially tested by manually applying a Bunsen burner flame to the foam. Burning of the foam out of contact with the flame did not occur and upon removal of the flame all burning immediately stopped and there was no subsequent rekindling of fire.

TEST II

In this later test the fire-retardant chemical mixture was as follows:
25% Ammonium Chloride
25% Ammonium Phosphate
25% Sodium Bicarbonate
25% Borax In this case foam was produced and tested in Sweden and received a high German B2 class rating when the fire-retardant chemical mixture was used so that in different tests the polyol contained both 30% and 35% of the weight of the polyol of the new fire-retardant mixture.

This German test DIN 4102 provides a standard acceptable in Europe and has been prepared "in the Special Section "Einheitliche Technische Baubestimmungen" (Unified Technical Building Regulations) of the Normenausschuss Bauwesen (Standards Committee Building Construction (NABau). It has been recommended to the Chief Building Inspectorates by the Institut fur Bautechnik (Institute for Building Technology), Berlin, for introduction in the building code procedures."

Briefly summarized this test involves a ventilated box with a Bunsen burner in its lower part, the building material specimen being positioned in the box and the burner flame applied to the specimen for 12 seconds. The rating depends on the length of the flame spread, charring and whether or not the specimen is self-extinguishing. The exact specifications of the test are rigidly specified, and a high B2 classification is difficult to achieve.

This German test was also applied to the foam of Test I.

TEST III

The fire-retardant chemicals were positioned as follows:
10% Ammonium Chloride
40% Ammonium Phosphate
25% Sodium Bicarbonate
25% Sodium Tetraborate In this case the foaming conditions were used as specified by the materials manufacturer for the production of a rigid foam suitable for molding plastic doors where catalytic expansion was required to be at a minimum and foaming was in a closed die.

Testing was by a door manufacturer in Sweden who reported better fire-retardant characteristics than obtained from prior art foams used to manufacture doors.

In all of these tests it is to be noted that 50% of the ammonium compounds were used with 50% of the sodium compounds to make 100% by weight of the mixture. In other words, the fire-retardant chemical compounds were mixed with a 50-50 ratio. This ratio is preferably not changed to any substantial extent.

However, the ratios between the ammonium chloride and ammonium phosphate can be varied and the ratios between the sodium borax and sodium bicarbonate can be varied, providing that fire-retardant amounts are used in each instance.

One reason for such variation is that when the mixture of fire-retardant chemicals has been blended into the polyol and the isocyanate added so that the mixture starts to rise and foam, the degree of rise and foam density depends not only on the amount of isocyanate as usual but now also on the amount of fire-retardant chemical mix added to the polyol. The borax tends to reduce the rising and the sodium bicarbonate tends to increase the rising. The two compounds must be balanced relative to each other to provide the desired foam rise and density. Although the fire-retardant mix itself tends to increase the foam density its effect can be counteracted by increasing the amount of sodium bicarbonate relative to the sodium tetraborate. The physical characteristics of the foam produced without using the fire-retardant chemicals can substantially be reproduced when using the fire-retardant chemicals by adjustment of the borax and sodium bicarbonate proportions. This should be done so that the 50-50 ratio between the ammonium and sodium compounds is maintained insofar as possible whenever the maximum possible fire-retardant actions are desired. Special conditions may require variations in the amounts of the ammonium compounds used relative to each other as indicated by Test III.

In connection with the above the ammonium chloride tends to increase foaming or rising, and the ammonium phosphate at a slower rate tends to increase foaming, so these two ammonium compounds may be varied if necessary for additional foam control. However, the ammonium phosphate is a more expensive compound and its use should be restricted when possible. In Test I the amount was only half that of the ammonium chloride, but in Test III the amount of sodium phosphate was four times the amount of ammonium chloride to assist in providing the rigid foam.

To increase foaming either or both the sodium bicarbonate and ammonium chloride can be increased, and to decrease foaming either or both can be decreased, in each instance relative to the other sodium or ammonium compound.

To enable an initial production of this new fire-retardant polyurethane foam with maximum efficiency, it is suggested that the four compounds in the form of dry particles should be blended together in equal proportions, meaning 25% of each by weight. The compounds as commercially purchased may already be of adequately small particle size but if not before or after mixing the particles should be ground to a size no larger than can be encapsulated. The four components should be thoroughly mixed together. This mixture should be blended into the polyol so as to comprise about 30-35% of the weight of the polyol and this should be done thoroughly. It is possible that less of the fire-retardant chemical mix might be used but it is believed that an allowance should be made for possible loss through some not being encapsulated by the foam cell walls.

The isocyanate is then blended into the above and the foaming action observed. If the rise time and foaming characteristics appear to be excessive, the borax can be increased relative to the sodium bicarbonate until satisfactory foaming is obtained. If the rise time is not rapid enough to indicate that the foam characteristics desired would be obtained, then the sodium bicarbonate can be increased relative to the sodium borate. The proportions should be kept so the sodium compounds represent 50% of the fire-retardant chemical mix, with the balance being the ammonium compounds. Possibly by changing the proportions of the sodium compounds the amount of the more expensive ammonium phosphate can be decreased without undesired foaming.

For appreciable fire-retardant effect the new fire-retardant chemical mix should have by weight in one of its portions 10% to 90% of either sodium compound and in the other portion from 10% to 90% of either ammonium compound. In other words, if 10% of one sodium compound is used the balance of 90% is the other sodium compound and if 10% of one ammonium compound is used the 90% balance should be the other ammonium compound. Balancing of the components can provide any practical degree of foam rise time and density.

This new fire-retardant polyurethane can be shaped by using either a mold in which foaming occurs or by depositing on a conveyor having upstanding flanges as used for continuous production in mat form.

What is claimed is:

1. Fire-retardant polyurethane foam containing a fire-retardant amount of dry particles of at least one compound that produces a fire-retardant gas when heated by fire and is unstable when exposed to air with time, the particles being encapsulated by the polyurethane of the foam so as to be protected from the air until exposed to fire by burning of the foam, the particles being substantially uniformly distributed throughout the foam and comprising substantially uniformly intermixed particles of at least one compound of ammonium chloride or phosphate and at least one compound of sodium borate or bicarbonate, said foam being prepared by intermixing said compounds in finely ground and dry condition to form a powder mix which is dispersed throughout or blended in a polyol reactant and then blending there with an isocyanate so as to produce the foam.

2. The foam of claim 1 in which by weight about 50% of the particles is at least one of said ammonium compounds and about a second 50% is at least one of said sodium compounds.

3. The foam of claim 2 in which said first 50% is by weight from about 10% to 90% of one of said ammonium compounds with the balance being the other ammonium compound, and said second 50% is by weight from 10% to 90% of one of said sodium compounds with the balance being the other sodium compound.

4. A method for making fire-retardant polyurethane foam, comprising substantially uniformly blending dry powder finely ground particles of a fire-retardant into polyol, and blending isocyanate into the polyol so as to cause foaming and produce the polyurethane foam, the fire-retardant producing a fire-retardant gas when exposed to fire and being unstable when exposed to air with time, the particles having a size causing them to be encapsulated by the polyurethane of the foam.

5. The method of claim 4 in which said particles are substantially uniformly intermixed particles of at least one compound of ammonium chloride or phosphate and at least one compound of sodium borate or sodium bicarbonate.

6. The method of claim 4 in which said particles are a mixture of ammonium chloride, ammonium phosphate, borax and sodium bicarbonate particles.

7. The method of claim 6 in which about a first 50% by weight of the particles is at least one of said ammonium compounds and about a second 50% by weight is at least one of said sodium compounds.

8. The method of claim 7 in which said first 50% is by weight from about 10% to 90% of one of said ammonium compounds and the balance is the other ammonium compound, and said second 50% is by weight from 10% to 90% of one of said sodium compounds and the balance is the other of the sodium compounds.

9. The method of claim 8 in which to control said foaming the amount of sodium borate relative to the amount of sodium bicarbonate is increased to decrease foaming, and to increase the foaming the amount of sodium bicarbonate is increased relative to the amount of borax.

10. The method of claim 8 in which to control said foaming the amount of ammonium phosphate relative to the amount of ammonium chloride is increased to reduce foaming, and to increase the foaming the amount of ammonium chloride is increased relative to the amount of ammonium phosphate to increase foaming.

* * * * *

UNITED STATES PATENT AND TRADEMARK OFFICE
CERTIFICATE OF CORRECTION

PATENT NO. : 4,551,483
DATED : November 5, 1985
INVENTOR(S) : Hamilton Hicks

It is certified that error appears in the above-identified patent and that said Letters Patent is hereby corrected as shown below:

The term of this patent subsequent to March 12, 2002, has been disclaimed.

Signed and Sealed this

Twenty-fourth Day of June 1986

[SEAL]

Attest:

DONALD J. QUIGG

Attesting Officer

Commissioner of Patents and Trademarks